J. Jenkins,
Shoe Sole Machine,
Nº 21,564.  Patented Sep. 21, 1858.
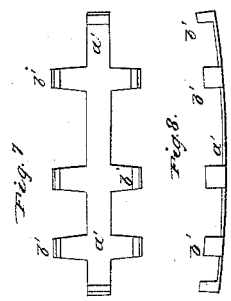
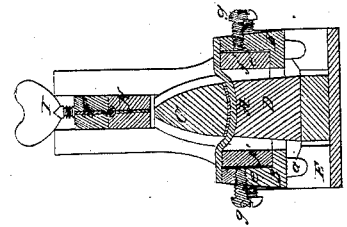
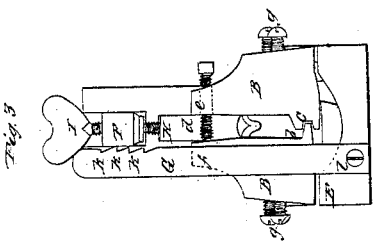
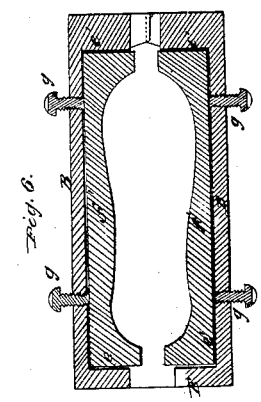
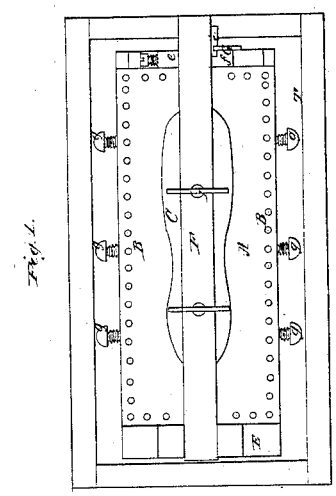
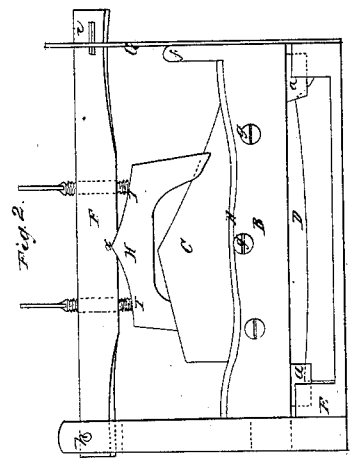
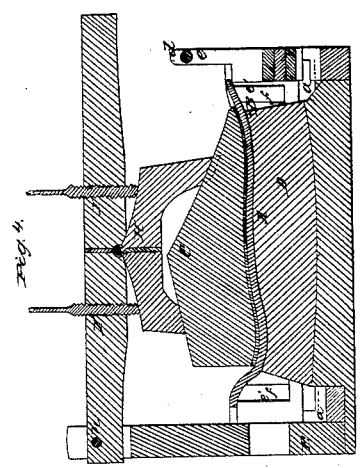

UNITED STATES PATENT OFFICE.

JACOB JENKINS, OF CHARLESTOWN, MASSACHUSETTS.

APPARATUS FOR APPLYING SOLES TO BOOTS AND SHOES.

Specification of Letters Patent No. 21,564, dated September 21, 1858.

*To all whom it may concern:*

Be it known that I, JACOB JENKINS, of Charlestown, in the county of Middlesex and State of Massachusetts, have invented an Improved Press or Apparatus for Applying Soles to Boots or Shoes by Means of Cement; and I do hereby declare that the same is fully described and represented in the following specification and the accompanying drawings, of which—

Figure 1, is a top view of the said apparatus as arranged in a reservoir or tank T. Fig. 2, is a side elevation and Fig. 3, an end elevation of it as it appears when separated from the reservoir. Fig. 4, is a longitudinal and vertical section of it. Fig. 5, is a transverse and vertical section while Fig. 6, is a horizontal section taken through the jaws and their holders.

In such drawings, A, denotes an elastic plate bed composed of caoutchouc or other suitable material and fastened along its outer edges to the upper surfaces of two rocker jaws or two rocker jaw holders.

The drawings exhibit this elastic bed as so applied to two jaw holders, B, B, each of which is supported by means of feet or rockers, *a*, *a*, or in such manner as to enable it to move laterally toward a last, C, when such last may be forced downward upon the elastic bed, A, and between the two jaw holders. In this case, it will be perceived that the jaw holders are drawn toward one another by the elastic bed. One of the jaw holders may have a tooth *b*, extending from one end of it and into a recess, *c*, made in the other jaw holder as shown in Fig. 3, and furthermore, a stop screw, *d*, may extend through a projection, *e*, from one jaw holder and toward a projection, *f*, from the other jaw holder, the same being as shown in the drawings. The said tooth and recess are to be formed in such manner as to cause each jaw holder to have a corresponding rate of movement which movement may be arrested by the stop screw of one bringing up against the projection of the other. Each of the said jaw holders I construct with a recess or chamber, *e'*, to receive and hold a jaw, *f'*. By such means, jaws of any desirable form or size may be used in the jaw holders and in this way the machine may be adapted to the application of soles to shoes of different sizes.

Immediately underneath the elastic bed, A, is an elastic cushion, D, which may be made of what is termed sponge india rubber or in any other suitable manner. This cushion becomes necessary to the elastic bed in order that the sole may be properly forced against the insole of the shoe when such shoe is on the last, C, and the said last is pressed downward with the elastic bed toward the cushion. Unless the cushion is employed there is danger of the sole being contracted or drawn together in such manner as to throw its middle part away from the insole.

In the drawings, *g*, *g*, *g*, are screws extending through each jaw holder and against its jaw, the same being to enable the jaw to be adjusted in a proper position with respect to the last, C.

The frame, E, which supports the cushion, D, and the two jaw holders B, B, carries a lever, F, which extends longitudinally over the last C, and has its fulcrum, *h*, at or near one end of it as shown in the drawings. From one side of said lever and near its opposite end a tooth *i*, projects into one of a series of notches, *k*, *k*, *k*, made in a catch bar, G, which at its foot is supported on a fulcrum, *l*, and so as to be capable of being turned either toward or away from the lever. The said lever bears upon a fulcrum, *x*, of a rocker bearer, H, formed as shown in the drawings or so as to rest on a last C, near its heel and its toe. Two screws, I, I, extend downward through the lever, F, and against the rocker bearer on opposite sides of its fulcrum. By means of such devices, the last C may not only be forced downward, but the pressure may be increased or diminished at the heel and toe part of it as circumstances may require. Furthermore, the means above described for holding the lever in position while the last is being forced downward enable the said lever and the rocker bearer, H, to be easily raised out of the way of the last, C, in order to facilitate either its removal from or its application to the bed, A.

In employing the above described machine for the cementation of soles to shoes, a shoe on a last and having an outer sole applied to its insole after being suitably covered with cement should be laid on the elastic bed A, and with the outer surface of the sole resting on the said bed and between the jaws or jaw holders. Next, the lever, F, is to be turned downward so as to press the rocker bearer H, down upon the last C. This will cause the bed A, to be stretched in manner to draw the jaws toward one another and the edges of the soles in a manner not only to move the sole into its proper position on the shoe, but to cause the elastic bed to force the sole near its edges into close contact with the shoe, the elastic cushion operating at the same time to prevent the middle part of the sole from being pressed away from the insole. After the lever, F, has thus been forced downward it should be locked in position by the catch bar, G. Next, the screws I, I, may be turned so as to increase the pressure more or less at either the heel or toe of the last, as circumstances may require. If desirable, either hot or cold water may be used in the tank, T, to facilitate the process of cementation. Instead of jaw holders separate from the jaws being used, they may be in one piece with the jaws, in which case, the elastic bed would be fastened directly to the jaw. The employment of separate jaw holders affords the advantage of substituting jaws of one form for those of a different one, and this renders the machine more universal in its application. Furthermore, it may be sometimes convenient to use with the elastic bed A, when the jaw holders are without any jaws on them, a sole holder and guide made as shown in top view in Fig. 7, in side view in Fig. 8, and in section in Fig. 9. It is made of thin sheet metal or of spring steel as shown at $a'$, $a'$, and furnished with projections, $b'$, $b'$, arranged on it as shown. This, when placed flatwise against the outer sole of the shoe and so that it may be received between the projections, $b$, $b'$, and they made to extend up the edges of the sole and upper will serve to hold the sole in place and adjust it under the inward pressure of the jaw holders, as the projections will be sprung inward by the jaw holders and serve as jaws. A contrivance of this kind is useful in cementing very small shoes.

I do not herein claim an elastic bed and a sole adjusting cavity or space. Nor do I herein claim constructing such sole adjusting cavity with adjustable sides or jaws as such have been the subjects of claim in another application for a patent which I have made, but What I do herein claim is—

1. The application of the rocker jaws or jaw holders to the elastic bed whereby the latter when forced downward is made to draw the jaws toward one another in manner as hereinbefore explained.

2. I also claim the combination of the elastic cushion or sole presser with the elastic bed A, and a mechanism for forcing the shoe down upon the said bed.

3. I also claim the combination of the rocker bearer, H, and its screws, I, I, with the holding lever, F, or its equivalent and to operate therewith substantially as specified.

4. I also claim the contrivance shown in Figs. 7, 8, and 9, and as above described to be used in manner and for the purpose specified.

In testimony whereof I have hereunto set my signature.

JACOB JENKINS.

Witnesses:
R. H. EDDY,
F. R. HALE, Jr.